(12) United States Patent
Onuma

(10) Patent No.: US 8,584,325 B2
(45) Date of Patent: Nov. 19, 2013

(54) STRUCTURE FOR FASTENING CLIP TO TRIM BOARD, CLIP, AND CLIP FASTENING METHOD

(75) Inventor: Kenji Onuma, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 147 days.

(21) Appl. No.: 12/855,307

(22) Filed: Aug. 12, 2010

(65) Prior Publication Data

US 2011/0041299 A1    Feb. 24, 2011

(30) Foreign Application Priority Data

Aug. 21, 2009  (JP) .................................. 2009-191761

(51) Int. Cl.
B60R 13/02    (2006.01)

(52) U.S. Cl.
USPC ................... 24/297; 24/289; 24/292; 24/458; 24/581.11; 296/214

(58) Field of Classification Search
USPC ......... 24/289, 292, 297, 458, 581.11, 588.11; 296/214, 146.7, 39.1, 191
See application file for complete search history.

(56) References Cited

U.S. PATENT DOCUMENTS

| | | | | |
|---|---|---|---|---|
| 4,505,611 A | * | 3/1985 | Nagashima et al. | 403/21 |
| 4,672,723 A | * | 6/1987 | Hugues et al. | 24/585.12 |
| 5,168,604 A | * | 12/1992 | Boville | 24/297 |
| 5,419,606 A | * | 5/1995 | Hull et al. | 296/146.7 |
| 5,469,606 A | * | 11/1995 | Hansen | 24/662 |
| 5,531,499 A | * | 7/1996 | Vecchio et al. | 296/146.7 |
| 6,119,306 A | * | 9/2000 | Antonucci et al. | 16/86 A |
| 6,264,393 B1 | * | 7/2001 | Kraus | 403/282 |
| 6,594,870 B1 | * | 7/2003 | Lambrecht et al. | 24/297 |
| 7,036,875 B2 | * | 5/2006 | Kanie | 296/204 |
| 7,114,221 B2 | * | 10/2006 | Gibbons et al. | 24/289 |
| 2004/0139584 A1 | * | 7/2004 | Gibbons et al. | 24/289 |
| 2005/0062312 A1 | * | 3/2005 | Kim | 296/146.7 |
| 2011/0210223 A1 | | 9/2011 | Nishiro | |

FOREIGN PATENT DOCUMENTS

JP    A-2004-183798    7/2004
JP    A-2009-041673    2/2009

OTHER PUBLICATIONS

Dec. 5, 2012 Office Action issued in Chinese Patent Application No. 201010261303.0 (with translation).

* cited by examiner

Primary Examiner — Robert J Sandy
Assistant Examiner — David Upchurch
(74) Attorney, Agent, or Firm — Oliff & Berridge, PLC

(57) ABSTRACT

A structure for fastening to a trim board a clip that has projection for fastening to a clip fitting seat of the trim board and a second projection for fastening to a vehicle body-side member. The first projection has an engagement portion and the clip fitting seat has multiple latch lugs used to position the clip. A distance between the latch lugs is enlargeable as the engagement portion is engaged therewith. The first projection has at least two types of engagement portions that differ in diameter at locations that are separated in a fastening direction. Thus, the clip is fastened to the clip fitting seat in at least two stages, including one state in which the clip is fastened to the clip fitting seat at low fastening load, and a fastened state that is achieved by fastening the clip to the clip fitting seat at high fastening load.

15 Claims, 11 Drawing Sheets

BEFORE FITTING CLIP
TO CLIP FITTING SEAT

DOOR TRIM OUTER FACE

DOOR TRIM INNER FACE

PERSPECTIVE VIEW OF IC PORTION

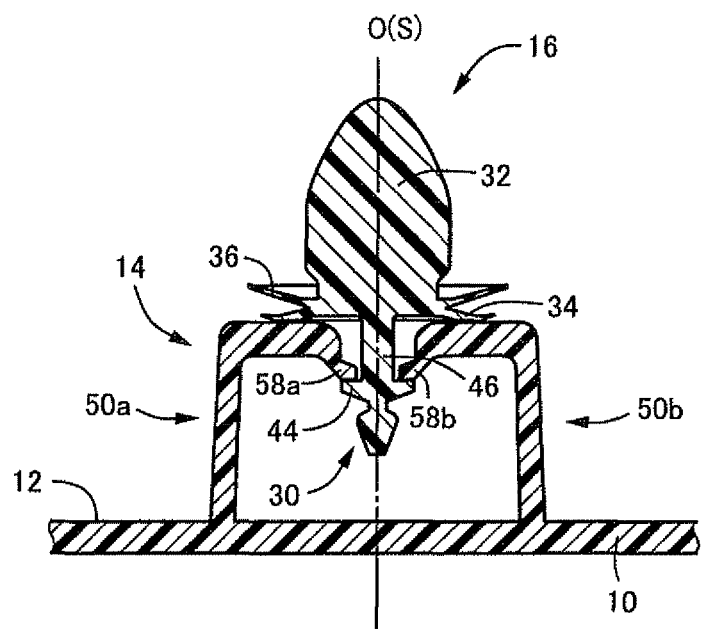

BEFORE FITTING CLIP TO CLIP FITTING SEAT

INTERMEDIATE FITTING STEP

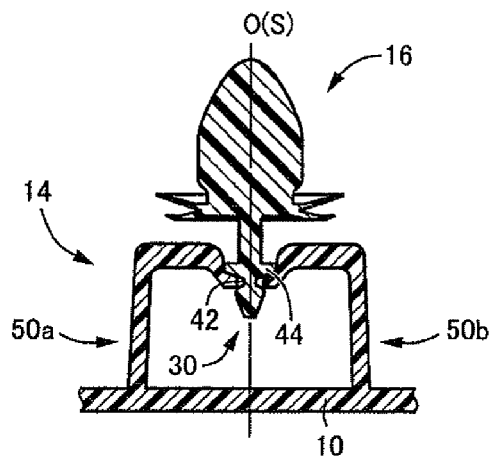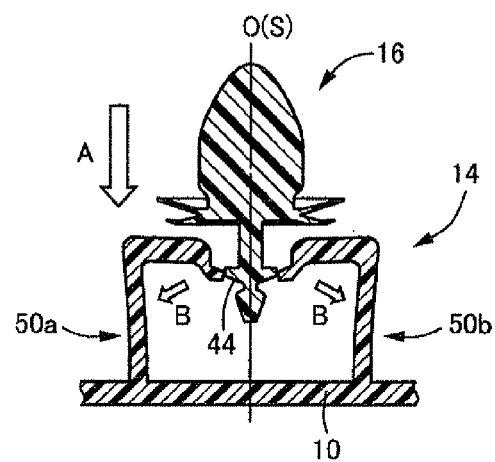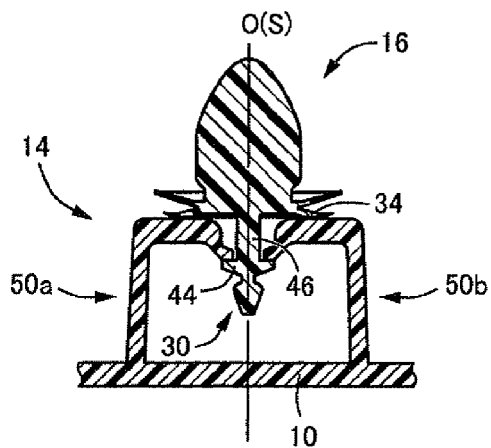

INTERMEDIATE FITTING STEP

FINAL FITTING STEP

BEFORE FITTING CLIP
TO CLIP FITTING SEAT

INTERMEDIATE FITTING STEP

INTERMEDIATE FITTED STATE

FINAL FITTING STEP

FINAL FITTED STATE

INTERMEDIATE FITTED STATE

FINAL FITTED STATE

STRUCTURE FOR FASTENING CLIP TO TRIM BOARD, CLIP, AND CLIP FASTENING METHOD

INCORPORATION BY REFERENCE

The disclosure of Japanese Patent Application No. 2009-191761 filed on Aug. 21, 2009 including the specification, drawings and abstract is incorporated herein by reference in its entirety

BACKGROUND OF THE INVENTION

1. Field of the Invention

The invention relates to a structure for fastening a clip to a trim board of a vehicle, and more specifically to a technology for making it possible to simultaneously fit multiple clips to clip fitting seats formed at multiple locations of a trim board.

2. Description of the Related Art

There is known a structure for fixing a trim board, used as vehicle interior parts, to a vehicle body-side member, for example, an inner panel, with the use of a clip. This clip has a) a first projection that is fastened to a clip fitting seat of the trim board, and b) a second projection that is fastened to the vehicle body-side member. c) As the second projection is fastened to the vehicle body-side member with the first projection fastened to the trim board, the trim board is fixed to the vehicle body-side member. Japanese Patent Application Publication No. 2004-183798 (JP-A-2004-183798) describes an example of the above-described fastening structure. According to JP-A-2004-183798, a ball is provided as a first projection, and a spherical recess is formed in a cylindrical clip fitting seat formed on a trim board. The ball is inserted into the clip fitting seat in a direction perpendicular to the trim board and then fitted into the spherical recess, and widening prevented ribs are engaged with an outer periphery of the clip fitting seat. As a result, a clip is fastened to the trim board. (See FIGS. 1 to 3.)

However, in the above-described usual clip fitting structure, unless the clip is fastened to the trim board in one stroke so that the ball of the clip is fitted into the spherical recess, that is called fastened state, the clip is removed from the spherical recess. Therefore, it is difficult to simultaneously fit the multiple clips to the clip fitting seats with the use of, for example, a press machine. Usually, the multiple clip fitting seats are formed on the trim board, and the trim board is fixed to a vehicle body-side member via the multiple clips. Therefore, it is necessary to perform a cumbersome work, that is, to fit the multiple clips one by one to the clip fitting seats. Even when the clips are pushed by a press machine to be fastened to the clip fitting seats, it is necessary to fit the clips one by one to the clip fitting seats. Accordingly, fastening the clips to the clip fitting seats takes a long time, which is not efficient.

SUMMARY OF THE INVENTION

The invention is made in light of the above-described circumstances. It is therefore an object of the invention to make it possible to simultaneously fit multiple clips to clip fitting seats formed at multiple locations of a trim board with the use of, for example, a press machine.

The object indicated above may be achieved according to a first aspect of the invention, which provides a structure for fastening a clip to a trim board, the clip having a first projection that is fastened to a clip fitting seat of the trim board and a second projection that is fastened to a vehicle body-side member, and fixing the trim board integrally to the vehicle body-side member as the second projection is fastened to the vehicle body-side member with the first projection fastened to the trim board, wherein: (a) the first projection has an engagement portion having a diameter that locally increases and decreases in a predetermined fastening direction that is substantially perpendicular to the trim board and the clip fitting seat has multiple latch lugs that are used to position the clip and elastically deformed in such a manner that a distance between the latch lugs is enlargeable as the engagement portion is engaged with the latch lugs, so that the first projection is fastened to the clip fitting seat by being pushed in the fastening direction; and (b) at least two types of the engagement portions that differ in diameter are formed in the first projection at locations that are apart from each other in the fastening direction or at least two sets of the latch lugs that differ in engaging area, at which the latch lugs are engaged with the engagement portion, are formed in the clip fitting seat at locations that are apart from each other in the fastening direction, so that the clip is fastened to the clip fitting seat in at least two staged fastened states which include an intermediate fastened state that is achieved by fastening the clip to the clip fitting seat at low fastening load and a final fastened state that is achieved by fastening the clip to the clip fitting seat at high fastening load.

The object indicated above may be achieved according to a second aspect of the invention, which provides the structure for fastening the clip to the trim board according to the first aspect of the invention, wherein: (a) the first projection has a small-diameter portion, a constricted portion that is smaller in diameter than the small-diameter portion, a large-diameter portion that is larger in diameter than the small-diameter portion, and a small-diameter fitted portion formed between the large-diameter portion and a seating portion that is seated on the clip fitting seat, which are formed concentrically with each other and which are located in this order from a tip end of the first projection in a direction in which the first projection is pushed into the clip fitting seat; (b) the clip fitting seat has a set of the latch lugs that is engaged with the small-diameter portion and the large-diameter portion in this order when the first projection is relatively pushed into the clip fitting seat in the fastening direction, and the distance between the latch lugs is enlarged due to elastic deformation so that each of the small-diameter portion and the large-diameter portion is permitted to pass through between the latch lugs; (c) there are at least two stages of fastened states in which the small-diameter portion has passed through between the latch lugs and the latch lugs are located at the constricted portion in the intermediate fastened state, and the large-diameter portion has passed through between the latch lugs and the latch lugs are located at the fitted portion in the final fastened state; and (d) each of a first diameter increase/decrease portion that extends from the small-diameter portion through the constricted portion to the large-diameter portion and that is used to position the clip in the intermediate fastened state and a second diameter increase/decrease portion that extends from the large-diameter portion through the fitted portion to the seating portion and that is used to position the clip in the final fastened state serves as the engagement portion.

The object indicated above may be achieved according to a third aspect of the invention, which provides the structure for fastening the clip to the trim board according to the second aspect of the invention, wherein: (a) the large-diameter portion has a tapered face having a diameter that decreases toward the constricted portion, and the set of latch lugs has partially tapered holding faces that correspond to the tapered face; and (b) in the intermediate fastened state, the latch lugs are located at the constricted portion so as to be clamped between the large-diameter portion and the small-diameter portion, and the tapered face of the large-diameter portion is in surface-contact with the holding faces of the latch lugs so that the clip is positioned so as to take a certain posture.

The object indicated above may be achieved according to a fourth aspect of the invention, which provides the structure for fastening the clip to the trim board according to the second or third aspect of the invention, wherein: the clip fitting seat is formed of a pair of lug members which extend from the trim board and of which upper end portions are apart from each other by a clearance g that is smaller than the small-diameter portion; a pair of the latch lugs is formed in the upper end portions of the pair of lug members so as to face each other; and the distance between the pair of latch lugs is enlarged due to elastic deformation of the pair of lug members so that each of the small-diameter portion and the large-diameter portion is permitted to pass through between the pair of latch lugs.

The object indicated above may be achieved according to a fifth aspect of the invention, which provides the structure for fastening the clip to the trim board according to the fourth aspect of the invention, wherein end portions of the pair of latch lugs have arc-shaped portions centering on a fitting axis 0 for fastening the clip and having a diameter d that is smaller than the small-diameter portion and larger than the clearance g between the pair of lug members when viewed from the fastening direction.

The object indicated above may be achieved according to a sixth aspect of the invention, which provides the structure for fastening the clip to the trim board according to the fourth or fifth aspect of the invention, wherein: (a) the pair of lug members has a pair of vertical plate portions that rise up from the trim board so as to be parallel to each other, and lateral plate portions that extend from upper end portions of the vertical plate portions bent in a direction that is substantially perpendicular to the vertical plate portions in such a manner that end portions of the lateral plate portions face each other with the clearance g left therebetween; and (b) the end portions of the lateral plate portions are stepped portions that are formed by bending to recess the end portions of the lateral plate portions toward the trim board, and the stepped portions are used as the latch lugs.

The object indicated above may be achieved according to a seventh aspect of the invention, which provides the structure for fastening the clip to the trim board according to the fourth or fifth aspect of the invention, wherein: (a) the pair of lug members has a pair of vertical plate portions that rise up from the trim board, and are substantially parallel to each other with the clearance g left therebetween at least upper end portions of the pair of vertical plate portions, and the latch lugs are formed integrally with portions of the upper end portions, which face each other; and (b) through-holes are formed in portions of the vertical-plate portions, which are immediately below the latch lugs, and each of the small-diameter portion and the large-diameter portion, which has passed through between the latch lugs while elastically deforming the vertical plate portions in such a manner that the vertical plate portions are further apart from each other, is latched with an upper edges of the through-holes so as to be prevented from being removed.

The object indicated above may be achieved according to an eighth aspect of the invention, which provides the structure for fastening the clip to the trim board according to any one of the first to seventh aspects of the invention, wherein a plurality of the clip fitting seats, to which the clips are fastened and of which the fastening directions are parallel to each other, is formed on the trim board.

The object indicated above may be achieved according to a ninth aspect of the invention, which provides the clip used in the structure for fastening the clip to the trim board according to any one of the second to seventh aspects of the invention.

The object indicated above may be achieved according to a tenth aspect of the invention, which provides a method for fastening the clips to the multiple clip fitting seats in the structure for fastening the clip to the trim board according to the eighth aspect of the invention, including: (a) an intermediate fastening step for achieving the intermediate fastened state by relatively moving the clips close to the multiple clip fitting seats in the fastening directions; and (b) a final fastening step for achieving the final fastened state by simultaneously relatively pushing the multiple clips fastened to the clip fitting seats in the intermediate fastened state in the fastening directions by a pushing machine.

According to the first aspect of the invention, the first projection has an engagement portion having a diameter that locally increases and decreases in a predetermined fastening direction that is substantially perpendicular to the trim board and the clip fitting seat has multiple latch lugs that are used to position the clip and elastically deformed in such a manner that a distance between the latch lugs is enlargeable as the engagement portion is engaged with the latch lugs, so that the first projection is fastened to the clip fitting seat by being pushed in the fastening direction; and at least two types of the engagement portions that differ in diameter are formed in the first projection at locations that are apart from each other in the fastening direction or at least two sets of the latch lugs that differ in engaging area, at which the latch lugs are engaged with the engagement portion, are formed in the clip fitting seat at locations that are apart from each other in the fastening direction, so that the clip is fastened to the clip fitting seat in at least two staged fastened states which include an intermediate fastened state that is achieved by fastening the clip to the clip fitting seat at low fastening load and a final fastened state that is achieved by fastening the clip to the clip fitting seat at high fastening load. As described above, it is possible to fasten the clip to the clip fitting seat in the intermediate fastened state, and the clip is pushed in the predetermined fastening direction, which is substantially perpendicular to the trim board, to be fastened to the clip fitting seat. Therefore, even if the multiple clip fitting seats are formed, the clips, which have been, for example, manually fastened to the clip fitting seats in the intermediate fastened state, are simultaneously pushed into the clip fitting seats by, for example, a single press machine to achieve the final fastened state. Therefore, it is possible to increase the efficiency of the clip fastening work, and to automatically perform the clip fastening work. Unlike a usual technology in which a large fastening force is required from the beginning, it is possible to prevent a fastening error, for example, to prevent the clip from falling down while the clip is fastened to the clip fitting seat. As a result, the efficiency of the fastening work is improved.

According to the second aspect of the invention, the first projection of the clip has a small-diameter portion, a constricted portion, a large-diameter portion and a fitted portion that are formed concentrically with each other from a tip end of the first projection in this order in a direction in which the clip is pushed into the clip fitting seat. When the clip is relatively moved toward the clip fitting seat in the fastening direction that is substantially perpendicular to the trim board, first, the small-diameter portion is engaged with the latch lugs formed in the clip fitting seat. Then, the small-diameter portion passes through between the latch lugs while elastically enlarging the distance between the latch lugs. As a result, the intermediate fastened state where the latch lugs are located at the constricted portion is achieved. When the clip is further pushed, the large-diameter portion passes through between the latch lugs while elastically enlarging the distance between the latch lugs. As a result, the final fastened state where the latch lugs are located at the fitted portion is achieved. For example, multiple constricted portions for achieving the intermediate fastened states may be formed in the first projection so that the multiple constricted portions pass through between the latch lags before the latch lugs reach the fitted portion. The structure are formed in such a manner that at least two staged fastened states are achieved.

In this case, because the small-diameter portion that is located at the tip end of the first projection is smaller in diameter than the large-diameter portion, it is possible to relatively easily push the clip into the clip fitting seat. Therefore, the intermediate fastened state is easily achieved, for example, manually. In order to shift the state from the intermediate fastened state to the final fastened state, the large-diameter portion that is larger in diameter than the small-diameter portion need to pass through between the latch lugs. Therefore, the clip is pushed with a relatively large pushing force (at high fastening load) by, for example, the press machine. Thus, it is possible to fasten the clip to the clip fitting seat with predetermined fastening strength.

According to the third aspect of the invention, the large-diameter portion has a tapered face having a diameter that decreases toward the constricted portion, and the set of latch lugs has partially tapered holding faces that correspond to the tapered face; and in the intermediate fastened state, the tapered face of the large-diameter portion is in surface-contact with the holding faces of the latch lugs so that the clip is positioned so as to take a certain posture. Thus, the posture of the clip in the intermediate fastened state is stabilized. Therefore, when the clip is further pushed to be placed in the final fastened state, it is possible to prevent product failure, which may be caused if the clip falls down. As a result, the production yield is improved.

According to the fourth aspect of the invention, the clip fitting seat is formed of a pair of lug members which extend from the trim board; a pair of the latch lugs is formed in the upper end portions of the pair of lug members so as to face each other; and the distance between the pair of latch lugs is enlarged due to elastic deformation of the pair of lug members so that each of the small-diameter portion and the large-diameter portion is permitted to pass through between the pair of latch lugs. As described above, each of the small-diameter portion and the large-diameter portion is permitted to pass through between the latch lugs due to elastic defamation of the pair of lug members. Therefore, the stiffness of the latch lugs is higher and the clip is more firmly fastened to the clip fitting seat with higher fastening strength than when, for example, only the latch lugs, which are part of the lug members, are elastically deformed. In addition, it is possible to easily adjust the fastening load and the fastening strength for the clip by changing the thickness or the shape of the pair of lug members.

According to the fifth aspect of the invention, end portions of the pair of latch lugs have arc-shaped portions centering on a fitting axis O for fastening the clip and having a diameter d that is smaller than the small-diameter portion and larger than the clearance g between the pair of lug members. Due to the arc-shaped portions of the pair of latch lugs, the clip is fastened to the trim board in such a manner that the central axis of the clip coincides with the fitting axis O at high position accuracy. As a result, it is possible to more easily perform the work for fixing the trim board to the vehicle body-side member via the clip.

According to the sixth aspect of the invention, the pair of lug members has a pair of vertical plate portions that rise up from the trim board so as to be parallel to each other, and lateral plate portions that extend from upper end portions of the vertical plate portions bent in a direction that is substantially perpendicular to the vertical plate portions in such a manner that end portions of the lateral plate portions are stepped portions that are formed by bending to recess the end portions of the lateral plate portions toward the trim board, and the stepped portions are used as the latch lugs. It is possible to easily perform the work for pushing the first projection into the clip fitting seat by elastically deforming the pair of lug members in such a manner that the pair of latch lugs is deformed so as to bend toward the trim board and the distance between the latch lugs is enlarged. On the other hand, deformation of the latch lugs in the reverse direction, that is, deformation of the latch lugs in such a direction that these latch lugs are further apart from the trim board is not easy, because the latch lugs and the lug members have relatively high stiffness. Therefore, once the small-diameter portion or the large-diameter portion of the first projection passes through between the pair of latch lugs and is fastened to the clip fitting seat, it is difficult to remove the clip from the clip fitting seat. Accordingly, high fastening strength is achieved. That is, it is possible to more easily perform the fastening work by decreasing the fastening load, while ensuring predetermined fastening strength. In addition, a relatively large space is formed in the inner side of the pair of lug members. Accordingly, for example, moldability while the lug members and the trim board are formed integrally with each other improves, which makes it easier to design molding dies including a slide die.

According to the seventh aspect of the invention, the clip fitting seat has a pair of vertical plate portions, and the latch lugs are formed with portions of upper end portions of the pair of the vertical plate portions, which face each other; and through-holes are formed in portions, which are immediately below the latch lugs, and each of the small-diameter portion and the large-diameter portion, which has passed through between the latch lugs while elastically deforming the vertical plate portions in such a manner that the vertical plate portions are further apart from each other, is latched with an upper edges of the through-holes so as to be prevented from being removed. The latched state of the small-diameter portion or the large-diameter portion is visually checked directly through the through-holes. Therefore, it is possible to suppress occurrence of product failure. In addition, each of the small-diameter portion and the large-diameter portion of the clip passes through between the latch lugs while elastically deforming the vertical plate portions. Therefore, the stiffness of the latch lugs is higher and the clip is more firmly fastened to the clip fitting seat with higher fastening strength than when only the latch lugs, which are part of the lug members, are elastically deformed. In addition, it is possible to appropriately adjust stiffness of the vertical plate portions, and, consequently, fastening strength for the clip by changing sizes and locations of the through-holes.

According to the ninth aspect of the invention, the substantially same effects as those in the structure for fastening the clip to the trim board according to each of the second to seventh aspects of the invention are obtained.

According to the tenth aspect of the invention, the intermediate fastened state is achieved by relatively moving the clips close to the multiple clip fitting seats in the fastening directions where a plurality of the clip fitting seats is formed on the trim board; and then the final fastened state is achieved by simultaneously relatively pushing the multiple clips fastened to the clip fitting seats in the intermediate fastened state in the fastening directions by a pushing machine. Consequently, the multiple clips can be effectively fastened.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is an enlarged cross-sectional view taken along the line II-II in FIG. 1C;

FIGS. 6A to 6E are views illustrating steps for fastening the clip to the clip fitting seat of the vehicle door trim shown in FIG. 1;

DETAILED DESCRIPTION OF THE EMBODIMENTS

Figure 1A:
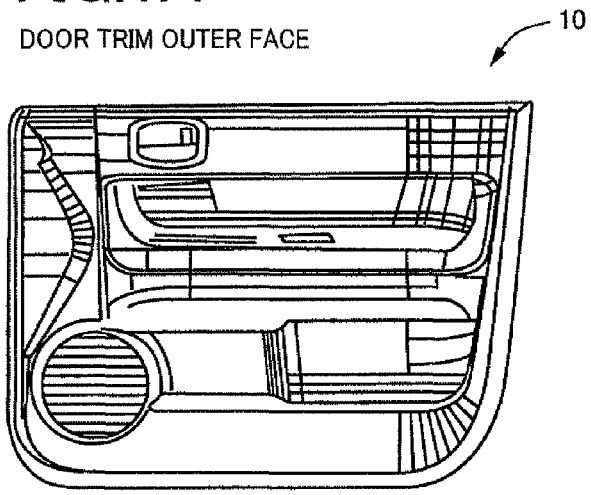
FIGS. 1A to 1C are views showing an example of a vehicle door trim to which a clip fastening structure according to a first embodiment of the invention is applied, FIG. 1A schematically showing an outer face of the vehicle door trim, FIG. 1B schematically showing an inner face of the vehicle door trim, and FIG. 1C being a perspective view of an IC portion in FIG. 1B viewed from a direction of an arrow A.

The invention relates to a structure for fastening a clip to a trim board, the clip being used to fix the trim board (interior parts), for example, a door trim or an instrument panel, to a vehicle body-side member, for example, an inner panel. The trim board is usually made of synthetic resin material, and, for example, an upholstery material is provided on a surface of the trim board when needed. The clip has, for example, a first projection and a second projection that are aligned along a single straight line so as to extend in opposite directions, that is, extend outward. The clip is also made of synthetic resin material. Alternatively, the clip may be made of another material, for example, metal material.

Usually, multiple clip fitting seats are formed integrally with the trim board, and the clips are fastened to the clip fitting seats. The trim board is fixed to the vehicle body-side member via the multiple clips. The multiple clip fitting seats are formed in such postures that fastening directions, in which the clips are fastened to the clip fitting seats, are parallel to each other and are substantially perpendicular to the trim board. The fastening directions are substantially perpendicular to the trim board so that the multiple clips are simultaneously fitted to the clip fitting seats. Therefore, the fastening directions need not be exactly perpendicular to the trim board. The fastening directions may be oblique to the trim board at a predetermined angle. Also, the trim board need not have a flat face. The trim board may be curved or have recesses and projections. The clip fitting seats need not be formed in uniform postures with respect to the trim board, for example, the postures in which the clip fitting seats are perpendicular to the trim board, as long as the fastening directions in which the clips are fastened to the clip fitting seats are parallel to each other.

When the clip is fastened to the clip fitting seat of the trim board, the clip may be moved toward the trim board. Alternatively, the trim board may be moved toward the clip. The manner in which the clip is fastened to the clip fitting seat may be different between an intermediate fastening step and a final fastening step.

In the second invention, the first projection has a small-diameter portion, a constricted portion, a large-diameter portion and a fitted portion that are formed concentrically with each other from a tip end of the first projection in this order in a direction in which the clip is pushed into the clip fitting seat. Two fastened states, that is, an intermediate fastened state where latch lugs are located at the constricted portion and a final fastened state where the latch lugs are located at the fitted portion are achieved. Alternatively, the structure may be formed in such a manner that three or more staged fastened states are achieved. For example, a medium-diameter portion and a constricted portion may be further formed between the constricted portion and the large-diameter portion so that intermediate fastened states are achieved at two locations in the axial direction. At least a higher fastening load (pushing load when the clip is fastened to the clip fitting seat) is required to achieve the final fastened state than to achieve the intermediate fastened state, and the final fastened state need not be a fastened state where fastening strength, that is, a load required to remove the clip from the clip fitting seat is high.

Figure 3A:
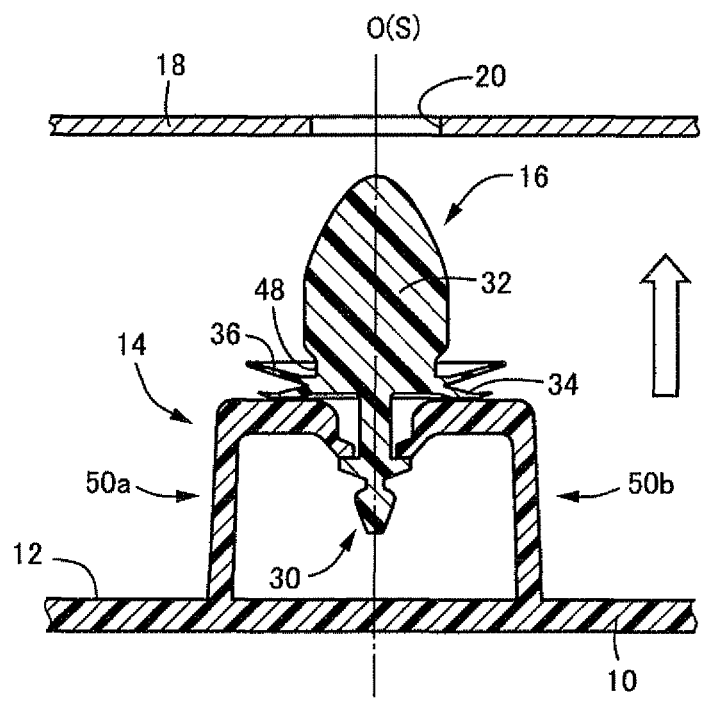
FIGS. 3A and 3B are cross-sectional views illustrating steps for fixing the vehicle door trim shown in FIG. 1 to an inner panel and corresponding to FIG. 2, FIG. 3A showing a state where the vehicle door trim has not been fixed to the inner panel, and FIG. 3B showing a state where a second projection of a clip has been fastened to the inner panel and therefore the vehicle door trim has been fixed to the inner panel.

In the first invention, large-diameter projected portions (engagement portions) may be formed in the first projection at two locations that are apart from each other in the fastening direction and engaged with engagement recesses formed in the latch lugs. Alternatively, a single engagement portion (an engagement recess or a projected portion) may be formed in the first projection and two sets of the latch lugs may be formed in the clip fitting seat at two locations that are apart from each other in the fastening direction so that two staged fastened states are achieved. For example, in the embodiment shown in FIGS. 1 to 3 of JP-A-2004-183798, spherical recesses 18 that correspond to the latch lugs may be formed in a fitting seat 16 at two locations that are apart from each other in the axial direction. The structure may be formed in such a manner that three or more staged fastened states that differ in fastening load are achieved.

A set of latch lugs or at least two sets of latch lugs may be formed, and a distance between the latch lugs in each set may be enlarged, for example, due to elastic deformation of the latch lugs themselves or due to elastic deformation of support portions such as vertical plate portions having the latch lugs. A set of latch lugs includes multiple latch lugs. For example, a pair of latch lugs is formed so as to be symmetric with respect to a fitting axis O, along which the first projection is fastened into the clip fitting seat. Alternatively, three or more latch lugs may be formed equiangularly around the fitting axis O. Asymmetric latch lugs may be employed. In a pair of lug members in the fourth aspect of the invention, at least the lug members are elastically deformed. Alternatively, the latch lugs may be elastically deformed in addition to the lug members.

In the third aspect of the invention, a tapered face is formed in the large-diameter portion, and the tapered face is in surface-contact with partially tapered holding faces formed in the multiple (a set of) latch lugs in the intermediate fastened state. However, in the other aspects of the invention, the clip may be positioned to take a certain posture, for example, when the clip is engaged with the clip fitting seat at multiple locations that are apart from each other in the fastening direction.

In the fifth aspect of the invention, end portions of the pair of latch lugs have arc-shaped portions centering on a fitting axis O and having a diameter d, and when the arc-shaped portions and, for example, the small-diameter portion are engaged with each other, the central axis of the first projection coincides with the fitting axis O. However, various modifications may be made in the other inventions. For example, one of the pair of latch lugs may be formed in a flat shape, or V-shaped portions may be formed instead of the arc-shaped portions.

In the sixth aspect of the invention, end portions of the lateral plate portions are stepped portions that are formed by bending to recess the end portions of the lateral plate portions toward the trim board, and the stepped portions are used as the latch lugs. However, in the other inventions, various modifications may be made. For example, the lateral plate portions that are substantially flat may be used as the latch lugs without being processed.

In the seventh invention, through-holes are formed in the vertical plate portions, and the latched state of each of the small-diameter portion and the large-diameter portion is visually checked directly through the through-holes. However, in the other inventions, recesses at which each of the small-diameter portion and the large-diameter portion can be latched may be only formed.

In the tenth invention, when multiple clip fitting seats are formed on the trim board, the final fastened state is achieved by simultaneously relatively pushing the multiple clips fastened to the clip fitting seats in the intermediate fastened state in the fastening directions by a pushing machine. In the intermediate fastening step, the clips may be fastened one by one to the clip fitting seats manually or by a low-load clip fastening machine (e.g. an air cylinder). In the other inventions, the clips may be fastened one by one to the clip fitting seats manually or by a pushing machine (e.g. an air cylinder or a hydraulic cylinder) in the final fastening step as well.

Figure 1B:
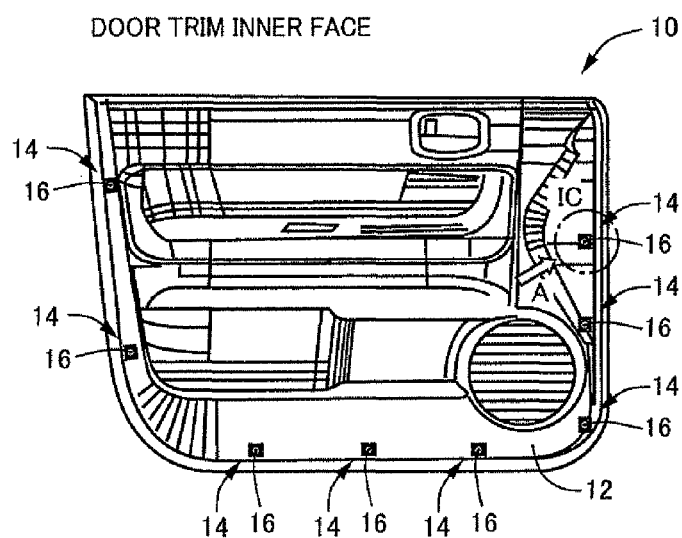
Figure 1C:
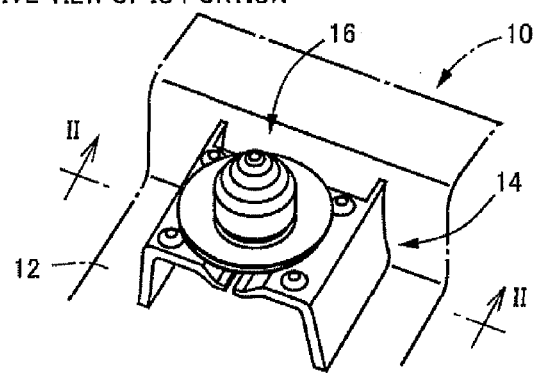

Hereafter, a first embodiment of the invention will be described with reference to the accompanying drawings. FIGS. 1A to 1C are views showing a vehicle door trim 10 to which the first embodiment of the invention is applied. FIG. 1A is a view schematically showing an outer face of the vehicle door trim 10, that is, a vehicle compartment-side face of the vehicle door trim 10. FIG. 1B is a view schematically showing an inner face of the vehicle door trim 10, which is on the opposite side of the outer face. FIG. 1C is a perspective view showing an IC portion in FIG. 1B viewed from a direction of an arrow A. The vehicle door trim 10 corresponds to a trim board, and is made of synthetic resin material and formed as a single-piece member. Multiple (eight, in FIG. 1B) clip fitting seats 14 are formed integrally with an outer periphery portion of an inner face 12 that is located inside of a door (on the outer side of a vehicle compartment). Clips 16 are fastened to the clip fitting seats 14. When the clips 16 are integrally fastened in fitting holes 20 fowled in an inner panel 18 of the vehicle door (see FIG. 3B), the vehicle door trim 10 is fixed to the inner panel 18. The inner panel 18 corresponds to a vehicle body-side member.

Figure 4A:
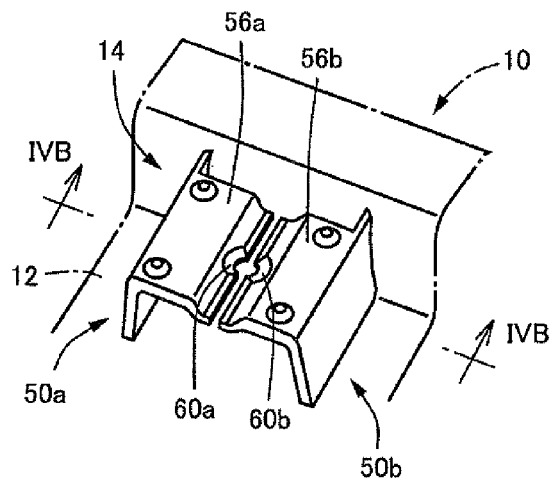
FIGS. 4A to 4C are views showing a clip fitting seat before the clip is fastened to the vehicle door trim shown in FIG. 1, FIG. 4A being a perspective view corresponding to FIG. 1C, FIG. 4B being an enlarged cross-sectional view showing the clip fitting seat taken along the line IVB-IVB in FIG. 4A, and FIG. 4C being a plain view showing a portion near a fitting axis O viewed from a direction in which the clip is fastened to the clip fitting seat.
Figure 4B:
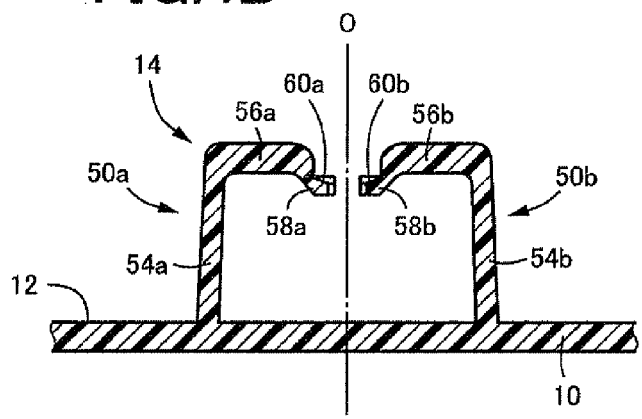
Figure 4C:
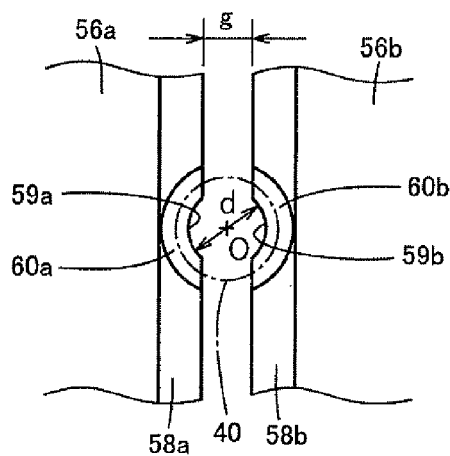
Figure 5A:
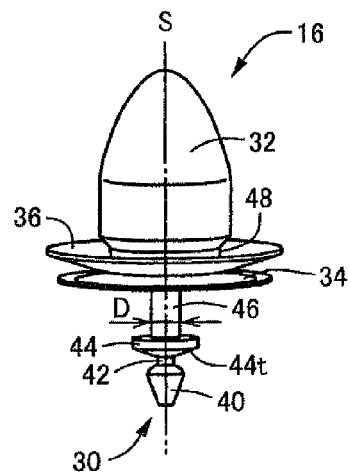
FIGS. 5A and 5B are views showing only the clip in FIG. 1, FIG. 5A being a perspective view, and FIG. 5B being a vertical cross-sectional view.
Figure 5B:
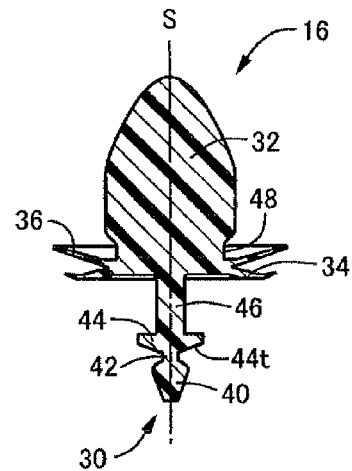

FIG. 2 is an enlarged cross-sectional view showing the IC portion taken along the line II-II in FIG. IC. FIGS. 4A to 4C are views showing the clip fitting seat 14 to which the clip 16 has not been fastened. FIGS. 5A and 5B are views showing only the clip 16. FIG. 4A is a perspective view corresponding to FIG. 1C, FIG. 4B is a cross-sectional view corresponding to FIG. 2, that is, an enlarged cross-sectional view showing the clip fitting seat 14 taken along the line IVB-IVB in FIG. 4A, and FIG. 4C is a plain view showing a portion near a fitting axis O viewed from a direction in which the clip 16 is fastened to the clip fitting seat 14 (hereinafter, referred to as "fastening direction" where appropriate) (viewed from above the clip fitting seat 14 in FIG. 4B). FIG. 5A is a perspective view showing the clip 16 viewed from a point that is slightly oblique to and above the clip 16. FIG. 5B is a longitudinal cross-sectional view of the clip 16, which includes a central axis S.

As shown in FIGS. 5A and 5B, the clip 16 has a first projection 30 and a second projection 32 that are aligned along the central axis S so as to extend in opposite directions, that is, extend outward. In addition, a first seating portion 34, which is large-diameter flange like and which is seated in the clip fitting seat 14, and a second seating portion 36, which is large-diameter flange like and which is seated in the inner panel 18, are formed between the first projection 30 and the second projection 32. The first projection 30, the second projection 32, the first seating portion 34 and the second seating portion 36 are made of synthetic resin material and formed integrally with each other. The first projection 30 has a small-diameter portion 40, a constricted portion 42 that is smaller in diameter than the small-diameter portion 40, a large-diameter portion 44 that is larger in diameter than the small-diameter portion 40, and a small-diameter fitted portion 46 fanned between the large-diameter portion 44 and the first seating portion 34, which are formed concentrically with each other and which are located in this order from a tip end of the first projection 30 in a direction in which the first projection 30 is pushed into the clip fitting seat 14. With this structure, the first projection 30 is fastened to the clip fitting seat 14 by being pushed into the clip fitting seat 14 in the fastening direction that is substantially perpendicular to the vehicle door trim 10 (up-down direction in FIG. 4B). The small-diameter portion 40 is formed in a tapered shape, as a whole, in such a manner that a diameter thereof is decreased toward a tip end. In addition, a large-diameter base end-side outer peripheral portion of the small-diameter portion 40 has a smooth arc shape in a cross section shown in FIG. 5B, and is connected to the small-diameter constricted portion 42. The large-diameter portion 44 has a tapered face 44t having a diameter that is decreased toward the constricted portion 42.

The fitted portion 46 is formed in a shape of a column having a predetermined diameter D. The fitted portion 46 has a predetermined length so that the clip 16 is integrally fastened to the clip fitting seat 14 in a certain posture when an upper end portion of the clip fitting seat 14 is elastically clamped between the large-diameter portion 44 and the first seating portion 34 as shown in FIG. 2.

Figure 3B:
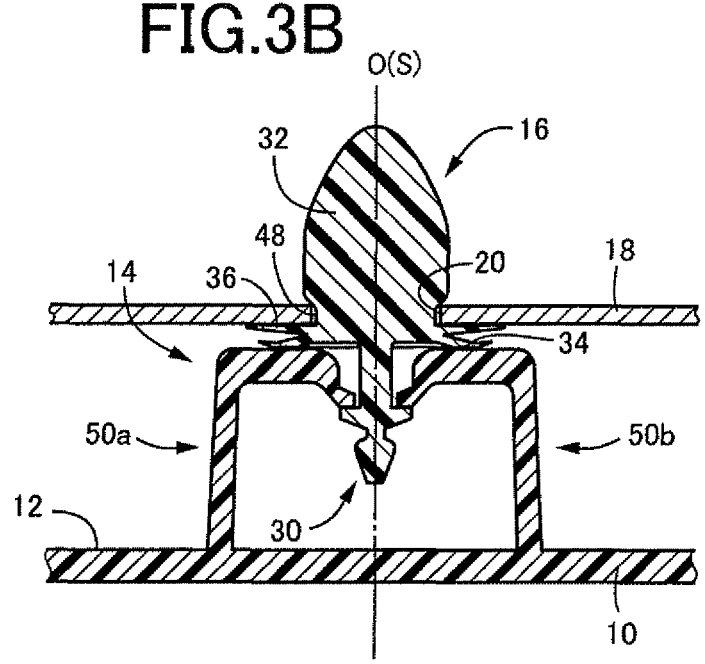

The second projection 32 has a base end portion that is formed in a shape of a column that is larger in diameter than the fitting hole 20 of the inner panel 18, and a spindle-shaped tip end portion that projects from the base end portion and that has a smooth semi-elliptical shape in a cross-section in FIG. 5B. In addition, the second projection 32 has a fitted portion 48 that is a constricted portion which is smaller in diameter than the fitting hole 20, and that is formed between the base end portion and the second seating portion 36. As shown in FIG. 3B, the second projection 32 is inserted into the fitting hole 20 from the tip end portion thereof. After the column-shaped base end portion passes through the fitting hole 20 while being elastically deformed, the inner panel 18 is located at the fitted portion 48 and the inner panel 18 is elastically clamped between the second projection 32 and the second seating portion 36. As a result, the clip 16 is fastened to the inner panel 18, and, consequently, the vehicle door trim 10 is fixed to the inner panel 18.

The clip fitting seat 14 shown in FIGS. 4A and 4B has a pair of lug members 50a and 50b that are provided integrally with the vehicle door trim 10 so as to rise up in a direction substantially perpendicular to the vehicle door trim 10. The lug members 50a and 50b are formed integrally with the vehicle door trim 10 with the use of a slide die (draw back die) or the like. The lug members 50a and 50b are formed so as to be symmetric with respect to the fitting axis O that is substantially perpendicular to the vehicle door trim 10. The lug members 50a and 50b have vertical plate portions 54a and 54b and the lateral plate portions 56a and 56b, respectively, and each of the lug members 50a and 50b has a substantially L-shaped cross section. The vertical plate portions 54a and 54b rise up from the inner face 12 of the vehicle door trim 10 in a direction substantially perpendicular to the inner face 12. The lateral plate portions 56a and 56b extend from upper ends of the vertical plate portions 54a and 54b bent in a direction substantially perpendicular to the vertical plate portions 54a and 54b in such a manner that end portions of the lateral plate portions 56a and 56b face each other. The end portions of the lateral plate portions 56a and 56b, which face each other, are apart from each other by a small clearance g, which is smaller than the small-diameter portion 40. In addition, the end portions are stepped portions or crank-shaped portions that are formed by bending to recess the end portions of the lateral plate portions 56a and 56b toward the vehicle door trim 10. Thus the formed stepped portions are used as latch lugs 58a and 58b. The small-diameter portion 40 shown in FIG. 4C indicates the maximum diameter of the small-diameter portion 40, and the clearance g is smaller than the maximum diameter of the small-diameter portion 40.

In a planar view of the clip fitting seat 14 viewed from the direction in which the clip 16 is fitted to the clip fitting seat 14 (in a state shown in FIG. 4C), the pair of latch lugs 58a and 58b has arc-shaped portions 59a and 59b centering on the fitting axis O and having a diameter d that is smaller than the small-diameter portion 40 and larger than the clearance g. When the arc-shaped portions 59a and 59b and the small-diameter portion 40 are engaged with each other, the central axis S of the clip 16 coincides with the fitting axis O. When the clip 16 is moved toward the clip fitting seat 14 from above the clip fitting seat 14 in FIG. 4B and the small-diameter portion 40 is engaged with the latch lugs 58a and 58b, the pair of lug members 50a and 50b is elastically deformed as indicated by arrows B in FIG. 6B. Thus, the distance between the pair of latch lugs 58a and 58b is enlarged in the lateral direction, whereby the small-diameter portion 40 is permitted to pass through between the latch lugs 58a and 58b. In the first embodiment, the upper end portions of the vertical plate portions 54a and 54b are elastically deformed in directions in which the upper end portions are further apart from each other, and corner portions, at which the vertical plate portions 54a and 54b and the lateral plate portions 56a and 56b are connected to each other, are elastically deformed in such a manner that the angles between the vertical plate portions 54a and 54b and the lateral plate portions 56a and 56b are reduced. In this way, the distance between the pair of latch lugs 58a and 58b is enlarged while the pair of latch lugs 58a and 58b is deformed so as to bend toward the vehicle door trim 10. Thus, the clip 16 is positioned in an intermediate fastened state where the pair of latch lugs 58a and 58b is located at the constricted portion 42 and clamped between the small-diameter portion 40 and the large-diameter portion 44 as shown in FIG. 6C.

The distance between the small-diameter portion 40 and the large-diameter portion 44 is set to a value at which the clip 16 is positioned without wobbling when the latch lugs 58a and 58b are clamped between the small-diameter portion 40 and the large-diameter portion 44 of the clip 16. Partially tapered holding faces 60a and 60b (see FIGS. 4A to 4C), which correspond to the tapered face 44t formed in the large-diameter portion 44, are formed in upper faces of the latch lugs 58a and 58b, respectively. When the holding faces 60a and 60b are pushed against the tapered face 44t and brought into surface-contact with the tapered face 44t in the intermediate fastened state, the clip 16 is positioned so as to take a certain posture in which the central axis S of the clip 16 substantially coincides with the fitting axis O.

When the clip 16, which has been in the intermediate fastened state described above, is further pushed in the fastening direction indicated by the arrow A as shown in FIG. 6D, the lug members 50a and 50b are engaged with the large-diameter portion 44 and elastically deformed as indicated by the arrows B and the distance between the latch lugs 58a and 58b is enlarged. Thus, the large-diameter portion 44 is permitted to pass through between the latch lugs 58a and 58b. As a result, the clip 16 is positioned in a final fastened state where the pair of latch lugs 58a and 58b is located at the fitted portion 46 and the latch lugs 58a and 58b and the lateral plate portions 56a and 56b are located between the large-diameter portion 44 and the first seating portion 34 as shown in FIG. 6E. Because the large-diameter portion 44 is larger in diameter than the small-diameter portion 40, the lug members 50a and 50b need to be elastically deformed by a larger amount to permit the large-diameter portion 44 to pass through between the latch lugs 58a and 58b. Therefore, a larger pushing force (higher fastening load) is required in the final fastening step in FIG. 6D than in the intermediate fastening step in FIG. 6B. The clip 16 is fastened more firmly to the clip fitting seat 14 with higher fastening strength in the final fastened state than in the intermediate fastened state. The first seating portion 34 that is larger in diameter than the large-diameter portion 44 is pushed against and tightly fastened to upper faces of the lateral plate portions 56a and 56b, and the clip 16 is held in a certain posture in which the central axis S substantially coincides with the fitting axis O more stably than in the intermediate fastened state. Each of a second diameter increase/decrease portion of the first projection 30, which extends from the large-diameter portion 44 through the fitted portion 46 to the first seating portion 34 and which is used to position the clip 16 in the final fastened state, and a first diameter increase/decrease portion of the first projection 30, which extends from the small-diameter portion 40 through the constricted portion 42 to the large-diameter portion 44 and which is used to position the clip 16 in the intermediate fastened state, corresponds to an engagement portion in claim 1.

It is possible to restrict and control the location of the clip 16 in the final fastened state by appropriately setting the diameter D of the column-shaped fitted portion 46 (see FIG. 5A) and the diameter d of the arc-shaped portions 59a and 59b formed in the pair of latch lugs 58a and 58b (see FIG. 4C). That is, if a predetermined amount of backlash is formed between the fitted portion 46 and the arc-shaped portions 59a and 59b, the clip 16 is permitted to move by a predetermined distance, which makes it possible to absorb a location deviation (positioning error) that may occur when the multiple clips 16 are fastened to engage with in the fitting holes 20 of the inner panel 18. If necessary, the clearance g may be set to a value smaller than the diameter D, when the clip 16 is positioned.

The multiple clip fitting seats 14 are formed on the inner face 12 of the vehicle door trim 10 in such a manner that the fitting axes O of the clip fitting seats 14 are substantially parallel to each other. Although the vehicle door trim 10 is not an entirely flat face and is partially curved or inclined, the clip fitting seats 14 are formed on the vehicle door trim 10 in postures in which the fitting axes O, that is, the fastening directions, are parallel to each other regardless of the shape of the vehicle door trim 10. Therefore, it is possible to fit the clips 16 to the clip fitting seats 14 in the certain fastening directions.

Figure 6A:
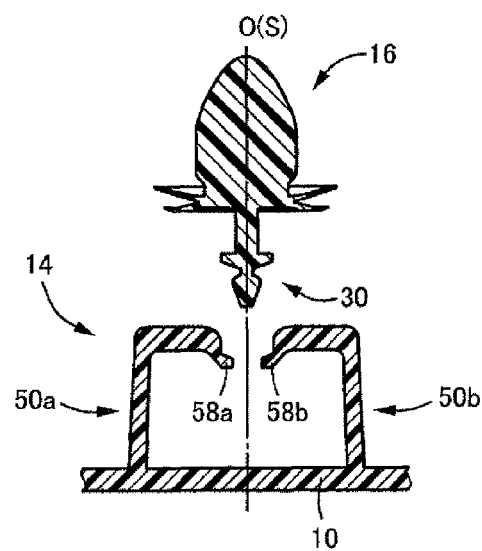

The clips 16 may be fastened to the clip fitting seats 14 formed at multiple locations of the vehicle door trim 10, for example, according to the steps (fastening method) shown in FIGS. 6A to 6E. FIGS. 6A to 6E are views illustrating basic fastening steps. In the intermediate fastening step in FIG. 6B, the clip 16 is relatively pushed into the clip fitting seat 14 in the fastening direction indicated by the arrow A with a comparatively small force. Thus, the small-diameter portion 40 passes through between the latch lugs 58a and 58b while elastically deforming the pair of lug members 50a and 50b to enlarge the distance between the latch lugs 58a and 58b as indicated by the arrows B. As a result, the intermediate fastened state shown in FIG. 6C is achieved. When the clip 16, which has been in the intermediate fastened state, is further pushed relatively into the clip fitting seat 14 with a large force in the fastening direction indicated by the arrow A as shown in FIG. 6D, the large-diameter portion 44 passes through between the latch lugs 58a and 58b while elastically deforming the pair of lug members 50a and 50b by a large amount to enlarge the distance between the latch lugs 58a and 58b as indicated by the arrows B. As a result, the final fastened state shown in FIG. 6E is achieved. It is possible to automatically perform both of the fastening steps in FIGS. 6B and 6D with the use of a fastening machine that uses, for example, an air cylinder or a hydraulic cylinder. Alternatively, a worker may manually perform all the steps. The clips 16 may be manually fastened one by one to the clip fitting seats 14 in the intermediate fastening step in FIG. 6B, and the clips 16 may be automatically fastened to the multiple clip fitting seats 14 with the use of a fastening machine that uses, for example, a hydraulic cylinder in the final fastening step in FIG. 6D.

Figure 6B:
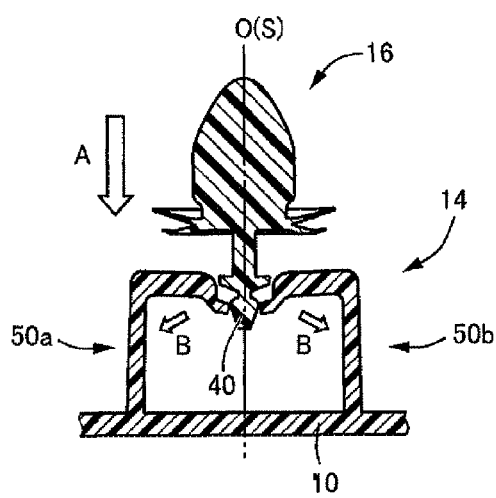
Figure 7A:
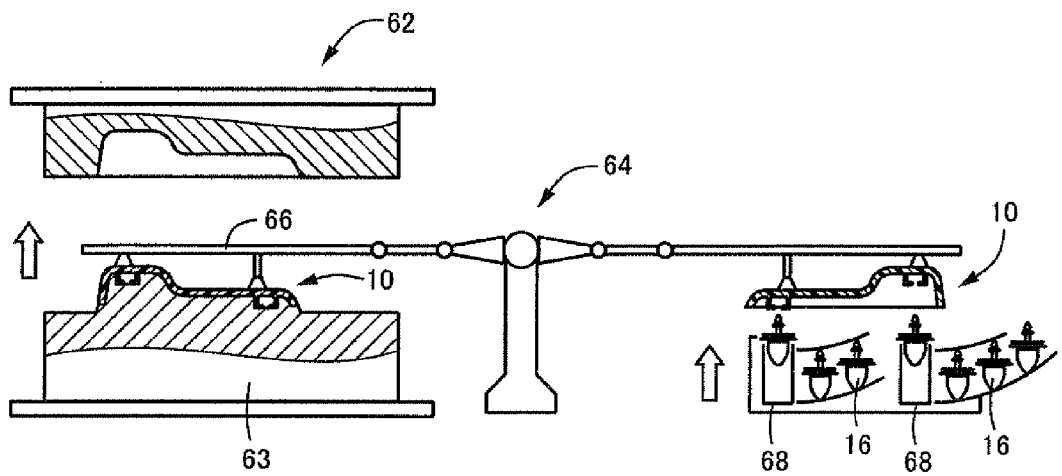
FIGS. 7A and 7B are views illustrating an example of a case where an intermediate fastening step shown in FIG. 6B and a final fastening step shown in FIG. 6D are automatically performed.
Figure 7B:
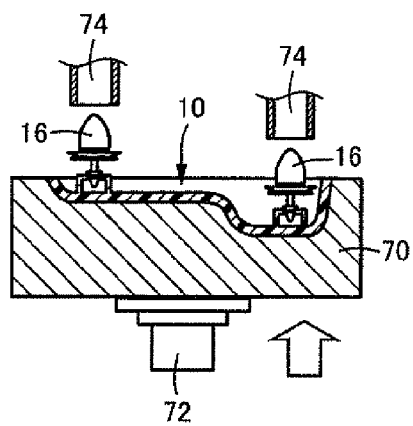

FIGS. 7A and 7B show a case where both of the fastening steps in FIGS. 6B and 6D are automatically performed with the use of a fastening machine. FIG. 7A shows the intermediate fastening step, and FIG. 7B shows the final fastening step. In the intermediate fastening step in FIG. 7A, the vehicle door trim 10 placed on a lower die 63 of a molding machine 62, which is used to form the vehicle door trim 10 and the multiple clip fitting seats 14 integrally with each other, is lifted and moved to an intermediate fastening site by a molded component removing robot 64. The molded component removing robot 64 has a removing attachment 66 to which, for example, an suction device is fitted. In the intermediate fastening site, the clips 16 are prepared to be placed at locations corresponding to the multiple clip fitting seats 14, and a supply feeder 68, for example, an air cylinder is provided. The clips 16 are pushed upward one by one by the supply feeder 68 and fastened to the clip fitting seats 14 in the intermediate fastened state.

In the final fastening step in FIG. 711, the vehicle door trim 10, where the clips 16 are fastened to the multiple clip fitting seats 14 in the intermediate fastened state, is placed on a base 70 in a posture in which the clips 16 face upward. When the base 70 is lifted upward by a pushing machine 72, for example, a hydraulic cylinder, the clips 16 come into contact cylindrical pushing jigs 74 that are arranged above the clip fitting seats 14. Thus, the clips 16 are simultaneously pushed relatively into the clip fitting seats 14 and placed in the final fastened state. As the pushing machine 72, for example, a press machine is preferably used.

In the structure for fastening the clip to the vehicle door trim 10 according to the first embodiment, the small-diameter portion 40, the constricted portion 42, the large-diameter portion 44, and the fitted portion 46 are concentrically formed in the first projection 30 of the clip 16 in this order from the tip end of the first projection 30 in the fastening direction. When the clip 16 is moved relatively toward the clip fitting seat 14 in the fastening direction that is parallel to the fitting axis O that is substantially perpendicular to the vehicle door trim 10, first, the small-diameter portion 40 is engaged with the pair of latch lugs 58a and 58b formed in the clip fitting seats 14 as shown in FIG. 6B. Then, the small-diameter portion 40 passes through between the latch lugs 58a and 58b while elastically enlarging the distance between the latch lugs 58a and 58b. As a result, the intermediate fastened state where the latch lugs 58a and 58b are located at the constricted portion 42 is achieved as shown in FIG. 6C. When the clip 16 is further pushed, the large-diameter portion 44 passes through between the pair of latch lugs 58a and 58b while elastically enlarging the distance between the latch lugs 58a and 58b as shown in FIG. 6D. As a result, the final fastened state where the latch lugs 58a and 58b are located at the fitted portion 46 is achieved as shown in FIG. 6E.

In this case, because the small-diameter portion 40 that is located at the tip end of the first projection 30 is smaller in diameter than the large-diameter portion 44, it is possible to relatively easily push the clip 16 into the clip fitting seat 14 in the intermediate fastening step. Therefore, the intermediate fastened state is easily achieved, for example, manually. In order to shift the state from the intermediate fastened state to the final fastened state, the large-diameter portion 44 that is larger in diameter than the small-diameter portion 40 need to pass through between the latch lugs 58a and 58b. Therefore, the clip 16 is pushed with a relatively large pushing force (at high fastening load) in the final fastening step. Thus, it is possible to fit the clip 16 to the clip fitting seat 14 with predetermined fastening strength.

With the clip fastening structure according to the first embodiment, it is possible to fit the clip 16 to the clip fitting seat 14 in the intermediate fastened state, and the clip 16 is pushed in the fastening direction, which is parallel to the fitting axis O that is substantially perpendicular to the vehicle door trim 10, to be fastened to the clip fitting seat 14. Therefore, even if the multiple clip fitting seats 14 are formed, the clips 16, which have been fastened to the clip fitting seats 14 in the intermediate fastened state, are simultaneously pushed into the clip fitting seats 14 by the single pushing machine 72, for example, in the final fastening step shown in FIG. 7B to achieve the final fastened state. Therefore, it is possible to increase the efficiency of the clip fastening work, and to automatically perform the clip fastening work. Unlike a usual technology in which a large fastening force is required from the beginning, it is possible to prevent a fastening error, for example, to prevent the clip 16 from tipping over while the clip 16 is fastened to the clip fitting seat 14. As a result, the efficiency of the fastening work is improved. In the intermediate fastening step, it is possible to automatically fit the clips 16 to the multiple clip fitting seats 14 in the intermediate fastened state with the use of the molded component removing robot 64 and the supply feeder 68, for example, as in the intermediate fastening step in FIG. 7A.

In the first embodiment, the large-diameter portion 44 of the first projection 30 of the clip 16 has the tapered face 44t having the diameter that is decreased toward the constricted portion 42, and the pair of latch lugs 58a and 58b has the partially tapered holding faces 60a and 60b, which conform to the tapered face 44t. In the intermediate fastened state, the tapered face 44t of the large-diameter portion 44 is pushed against and brought into surface-contact with the holding faces 60a and 60b of the latch lugs 58a and 58b, the clip 16 is positioned so as to take a certain posture. Thus, the posture of the clip 16 in the intermediate fastened state is stabilized. Therefore, when the clip 16 is further pushed to be placed in the final fastened state, it is possible to prevent product failure, which may be caused if the clip 16 tips over. As a result, the production yield is improved.

In the first embodiment, the clip fitting seat 14 is formed of the pair of lug members 50a and 50b rising up from the vehicle door trim 10, and the pair of latch lugs 58a and 58b is formed at the upper end portions of the lug members 50a and 50b so as to face each other. In addition, the small-diameter portion 40 and the large-diameter portion 44 of the first projection 30 are permitted to pass through between the latch lugs 58a and 58b due to elastic deformation of the pair of lug members 50a and 50b. Therefore, the stiffness of the latch lugs 58a and 58b can be higher so that the clip 16 is more firmly fastened to the clip fitting seat 14 with higher fastening strength than when, for example, only the latch lugs 58a and 58b, which are part of the lug members 50a and 50b, are elastically deformed. In addition, it is possible to easily adjust the fastening load and the fastening strength for the clip 16 by changing the thickness or the shape of the pair of lug members 50a and 50b.

The pair of lug members 50a and 50b is formed of the vertical plate portions 54a and 54b that rise up from the vehicle door trim 10 so as to parallel to each other, and the lateral plate portions 56a and 56b that extend from the upper end portions of the vertical plate portions 54a and 54b bent in the direction substantially perpendicular to the vertical plate portions 54a and 54b in such a manner that the end portions of the lateral plate portions 56a and 56b face each other. In addition, the end portions of the lateral plate portions 56a and 56b are the stepped portions that are used as the latch lugs 58a and 58b. Therefore, it is possible to easily perform the work for pushing the first projection 30 into the clip fitting seat 14 by elastically deforming the pair of lug members 50a and 50b as indicated by the arrows B as shown in FIGS. 6B and 6D in such a manner that the pair of latch lugs 58a and 58b is deformed so as to bend toward the vehicle door trim 10 and the distance between the latch lugs 58a and 58b is enlarged. On the other hand, deformation of the latch lugs 58a and 58b in the reverse direction, that is, deformation of the latch lugs 58a and 58b in such a direction that these latch lugs 58a and 58b are further apart from the vehicle door trim 10 (upward in each of FIGS. 6A to 6E) is not easy, because the latch lugs 58a and 58b and the lug members 50a and 50b have relatively high stiffness. Therefore, once the small-diameter portion 40 or the large-diameter portion 44 of the first projection 30 passes between the pair of latch lugs 58a and 58b and is fastened to the clip fitting seat 14, it is difficult to remove the clip 16 from the clip fitting seat 14. Accordingly, high fastening strength is achieved. That is, it is possible to more easily perform the fastening work by decreasing the fastening load, while ensuring predetermined fastening strength. In addition, a relatively large space is formed on the inner side of the pair of lug members 50a and 50b. Accordingly, moldability when the lug members 50a and 50b and the vehicle door trim 10 are formed integrally with each other improves, which makes it easier to design molding dies including a slide die.

In the first embodiment, the arc-shaped portions 59a and 59b, which are centering on the fitting axis O and having the predetermined diameter d, are formed in end portions of the pair of latch lugs 58a and 58b. Due to the arc-shaped portions 59a and 59b, the clip 16 is fastened to the vehicle door trim 10 in such a manner that the central axis S of the clip 16 coincides with the fitting axis O at high accuracy. As a result, it is possible to more easily perform the work for fastening the vehicle door trim 10 to the inner panel 18 via the clip 16.

Next, other embodiments of the invention will be described. In the following embodiments, the portions that are substantially the same as those in the first embodiment will be denoted by the same reference numerals as those in the first embodiment, and detailed description thereof will not be provided below.

Figure 8A:
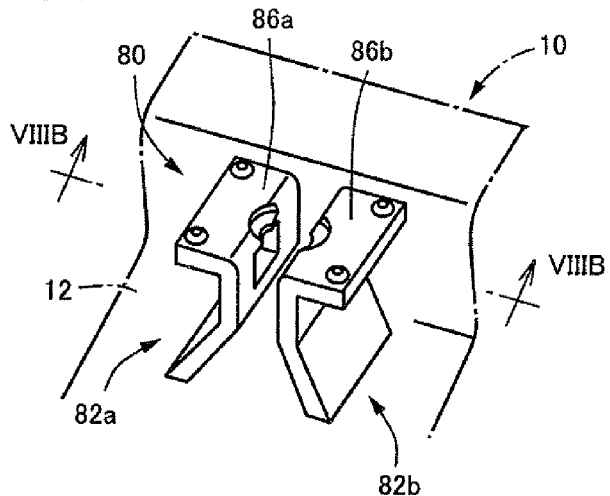
FIGS. 8A to 8C are views illustrating a second embodiment of the invention, and corresponding to FIGS. 4A to 4C, respectively.
Figure 8B:
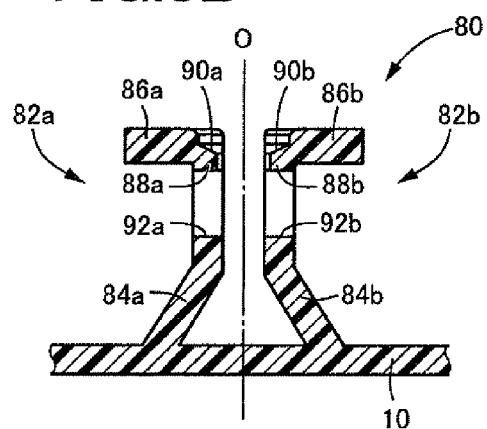
Figure 8C:
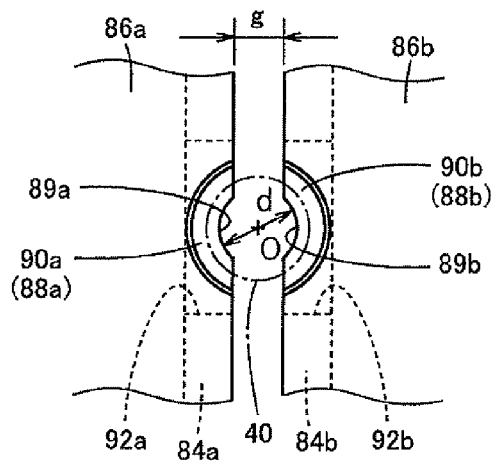

FIGS. 8A to 8C are views showing a clip fitting seat according to a second embodiment, and correspond to FIGS. 4A to 4C, respectively. FIGS. 9A to 9E are views illustrating steps for fastening the clip 16 to a clip fitting seat 80 in FIG. 8, and correspond to FIGS. 6A to 6E, respectively. The clip fitting seat 80 has a pair of lug members 82a and 82b extending from the vehicle door trim 10 and formed integrally with the vehicle door trim 10. The lug members 82a and 82b are formed integrally with the vehicle door trim 10, and fowled so as to be symmetric with respect to the fitting axis O that is substantially perpendicular to the vehicle door trim 10. The lug members 82a and 82b have vertical plate portions 84a and 84b and lateral plate portions 86a and 86b, respectively. The vertical plate portions 84a and 84b rise up from the inner face 12 of the vehicle door trim 10. The lateral plate portions 86a and 86b extend from upper ends of the vertical plate portions 84a and 84b bent in opposite directions that are substantially perpendicular to the vertical plate portions 84a and 84b, respectively. Each of the lug members 82a and 82b has a substantially L-shaped cross section as a whole. The vertical plate portions 84a and 84b are bent at middle portions in such a manner that upper portions of the vertical plate portions 84a and 84b are parallel to each other and substantially perpendicular to the vehicle door trim and lower portions of the vertical plate portions 84a and 84b are oblique to the upper portions. Base end portions of the lateral plate portions 86a and 86b, that are close to each other, that is, the upper end portions of the vertical plate portions 84a and 84h are apart from each other by the clearance g which is smaller than the diameter (maximum diameter) of the small-diameter portion 40 of the clip 16. In addition, a pair of latch lugs 88a and 88b is formed in the base end portions of the lateral plate portions 86a and 86b, that is, the upper end portions of the vertical plate portions 84a and 84b, which face each other.

Figure 9A:
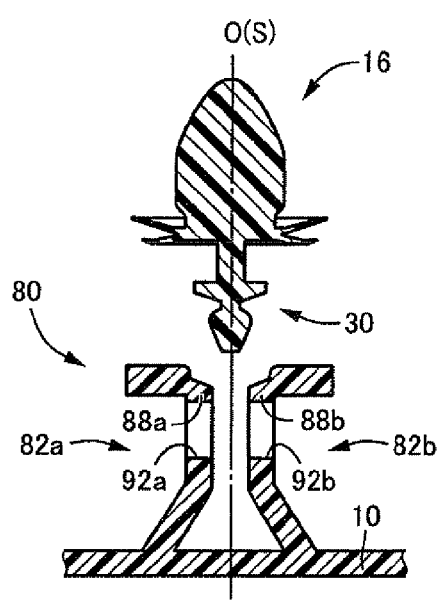
FIGS. 9A to 9E are views illustrating steps for fastening the clip to a clip fitting seat in FIG. 8, and corresponding to FIGS. 6A to 6E, respectively.
Figure 9B:
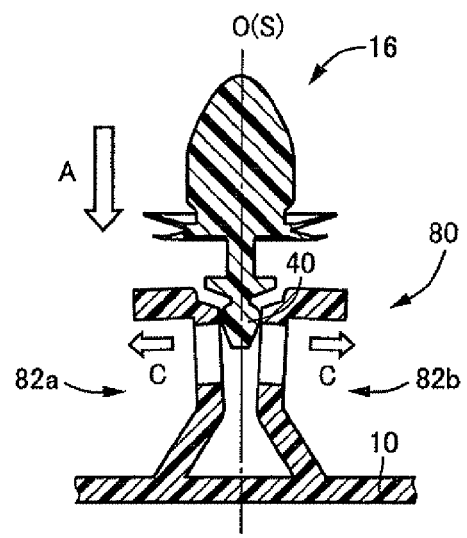
Figure 9C:
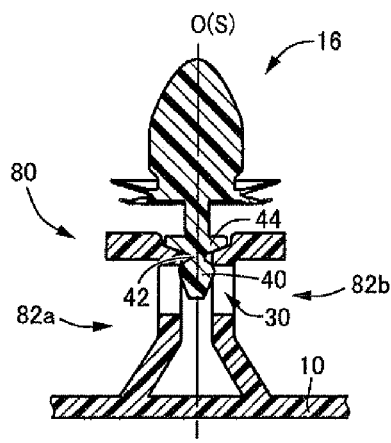

In a planar view of the clip fitting seat 14 viewed from the direction in which the clip 16 is fastened to the clip fitting seat 80 (in a state shown in FIG. 8C), the pair of latch lugs 88a and 88b has arc-shaped portions 89a and 89b centering on the fitting axis 0 and having the diameter d that is smaller than the small-diameter portion 40 and larger than the clearance g. When the arc-shaped portions 89a and 89b and the small-diameter portion 40 are engaged with each other, the central axis S of the clip 16 coincides with the fitting axis O. When the clip 16 is moved close toward the clip fitting seat 80 from above the clip fitting seat 80 in FIG. 8B and the small-diameter portion 40 is engaged with the latch lugs 88a and 88b, the pair of lug members 82a and 82b is elastically deformed so as to be further apart from each other in right and left direction as indicated by arrows C in FIG. 9B. Thus, the distance between the pair of latch lugs 88a and 88b is enlarged in the lateral direction, whereby the small-diameter portion 40 is permitted to pass through between the latch lugs 88a and 88b. Thus, the clip 16 is positioned in an intermediate fastened state where the pair of latch lugs 88a and 88b is located at the constricted portion 42 and clamped between the small-diameter portion 40 and the large-diameter portion 44 as shown in FIG. 9C. Partially tapered holding faces 90a and 90b, which conform to the tapered face 44t formed in the large-diameter portion 44, are formed in upper faces of the latch lugs 88a and 88b, respectively. When the holding faces 90a and 90b are pushed against the tapered face 44t and brought into surface-contact with the tapered face 44t in the intermediate fastened state, the clip 16 is positioned so as to take a certain posture in which the central axis S of the clip 16 substantially coincides with the fitting axis O.

Figure 9D:
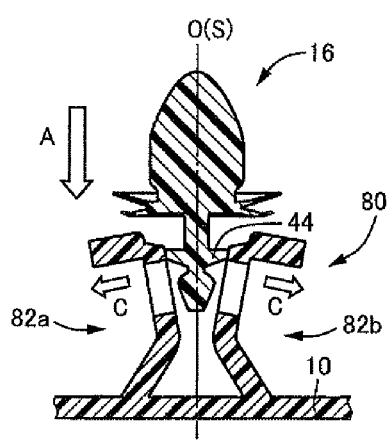
Figure 9E:
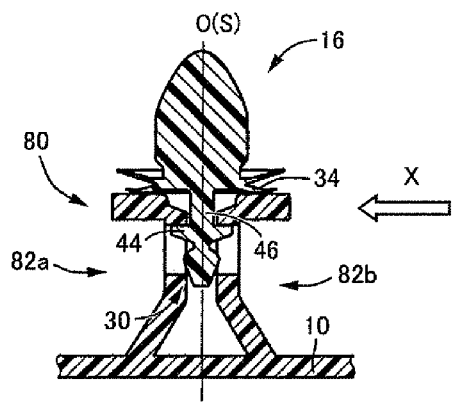

When the clip 16, which has been in the intermediate fastened state, is further pushed in the fastening direction indicated by an arrow A as shown in FIG. 9D, the latch lugs 88a and 88b are engaged with the large-diameter portion 44 and the distance between the latch lugs 88a and 88b is enlarged while the lug members 82a and 82b are elastically deformed by a larger amount as indicated by arrows C. Thus, the large-diameter portion 44 is permitted to pass through between the latch lugs 88a and 88b. As a result, the clip 16 is positioned in a final fastened state where the pair of latch lugs 88a and 88b is located at the fitted portion 46 and the latch lugs 88a and 88b and the lateral plate portions 86a and 86b are located between the large-diameter portion 44 and the first seating portion 34 as shown in FIG. 9E. Because the large-diameter portion 44 is larger in diameter than the small-diameter portion 40, the lug members 82a and 82b need to be elastically deformed by a larger amount to permit the large-diameter portion 44 to pass through between the latch lugs 88a and 88b. Therefore, a larger pushing force (higher fastening load) is required in the final fastening step in FIG. 9D than in the intermediate fastening step in FIG. 9B. The clip 16 is fastened more firmly to the clip fitting seat 80 with higher fastening strength in the final fastened state than in the intermediate fastened state. The first seating portion 34 that is larger in diameter than the large-diameter portion 44 is pushed against and tightly fastened to upper faces of the lateral plate portions 86a and 86b, and the clip 16 is held in a certain posture in which the central axis S substantially coincides with the fitting axis O more stably than in the intermediate fastened state.

The clip 16 has the small-diameter portion 40, the constricted portion 42, the large-diameter portion 44, the fitted portion 46, the first seating portion 34, etc., and has substantially the same structure as that in the first embodiment. However, a diameter and an axial length of each portion are set appropriately based on a required strength, dimensions of the latch lugs 88a and 88b, etc.

Figure 10:
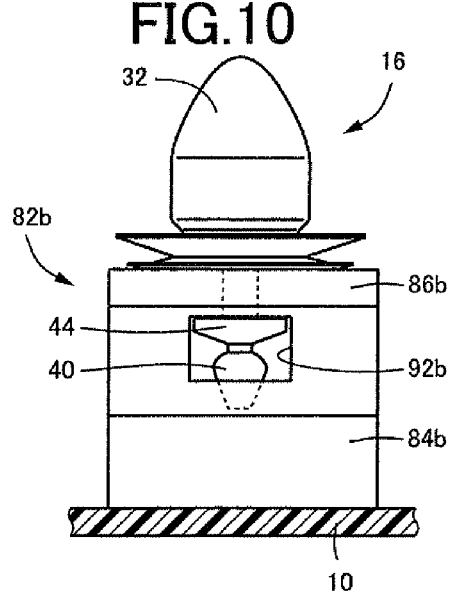
FIG. 10 is a side view showing the clip and the clip fitting seat viewed from a direction of an arrow X shown in FIG. 9E.

Through-holes 92a and 92b are formed in portions of the vertical plate portions 84a and 84b of the pair of lug members 82a and 82b, which are immediately below the latch lugs 88a and 88b. The small-diameter portion 40 or the large-diameter portion 44, which has passed through between the latch lugs 88a and 88b while elastically deforming the vertical plate portions 84a and 84b in such a manner that the vertical plate portions 84a and 84b are further apart from each other, is latched with upper edges of the through-holes 92a and 92b so as to be prevented from being removed. In other words, if the through-holes 92a and 92b are formed, portions above the through-holes 92a and 92b serve as the latch lugs 88a and 88b. In addition, as shown in FIG. 10, the latched state of the small-diameter portion 40 or the large-diameter portion 44 is visually checked directly through the through-holes 92a and 92b. Therefore, it is possible to suppress occurrence of product failure. It is possible to appropriately adjust stiffness of the lug members 82a and 82b, and, consequently, fastening strength for the clip 16 by changing sizes and locations of the through-holes 92a and 92b. FIG. 10 is a side view showing the clip 16 and the clip fitting seat 80 viewed in the direction indicated by an arrow X in FIG. 9E.

It is possible to control and restrict the location of the clip 16 in the final fastened state by appropriately setting a relationship between widths or shapes of the through-holes 92a and 92b and an outer diameter of the large-diameter portion 44 of the clip 16 or a relationship between the diameter D of the column-shaped fitted portion 46 and the diameter d of the arc-shaped portions 89a and 89b formed in the pair of latch lugs 88a and 88b. That is, if the width of each of the through-holes 92a and 92b is set to be larger than an outer diameter of the large-diameter portion 44 and the diameter d is set to be larger than the diameter D, the clip 16 is permitted to move. Therefore, it is possible to absorb a location deviation (positioning error) that may occur when the multiple clips 16 are fitted in the fitting holes 20 of the inner panel 18. In the second embodiment as well, if necessary, the clearance g may be set to a value smaller than the diameter D, when the clip 16 is positioned.

Figure 11A:
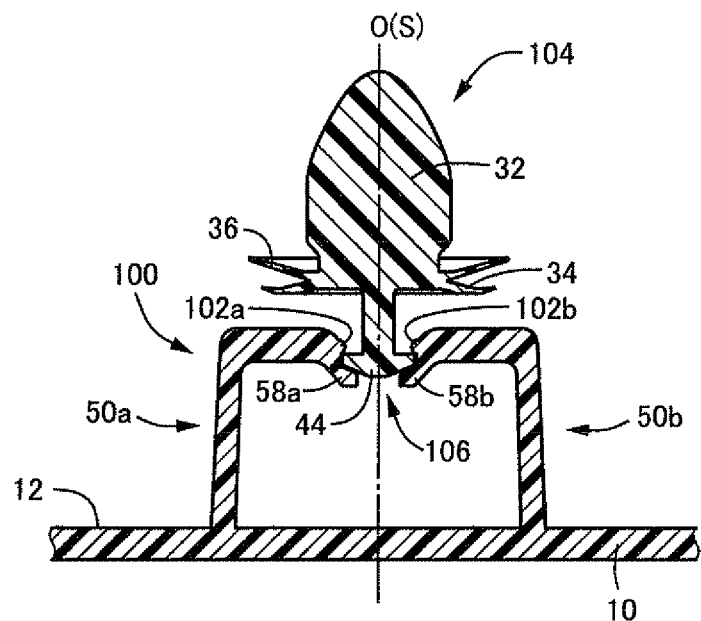
FIGS. 11A and 11B are views showing a third embodiment of the invention, FIG. 11A being a cross-sectional view showing an intermediate fastened state, and FIG. 11B being a cross-sectional view showing a final fastened state.

Hereafter, a third embodiment of the invention will be described. A clip fitting seat 100 in FIGS. 11A and 11B differs from the clip fitting seat 14 in the first embodiment in that a pair of latch lugs (first pair of latch lugs) 102a and 102b, which are relatively small, is formed at positions above the pair of latch lugs (second pair of latch lugs) 58a and 58b by a predetermined distance. A first projection 106 of a clip 104 has the large-diameter portion 44 and the fitted portion 46, but does not have the small-diameter portion 40 and the constricted portion 42. In the third embodiment, when the large-diameter portion 44 is engaged with the relatively small latch lugs 102a and 102b, the pair of lug members 50a and 50b is elastically deformed so as to be further apart from each other in the lateral direction and the distance between the latch lugs 102 and 102b is enlarged. Then, the large-diameter portion 44 passes through between the latch lugs 102a and 102 and is located between the pair of latch lugs 58a and 58b and the pair of latch lugs 102a and 102b. As a result, an intermediate fastened state shown in FIG. 11A is achieved. In the intermediate fastened state, the large-diameter portion 44 is elastically clamped between the pair of latch lugs 58a and 58b and the pair of latch lugs 102a and 102b, and the tapered face 44t and the holding faces 60a and 60b are brought into the surface-contact with each other. Thus, the clip 104 is positioned so as to take a certain posture in which the central axis S and the fitting axis O substantially coincide with each other.

Figure 11B:
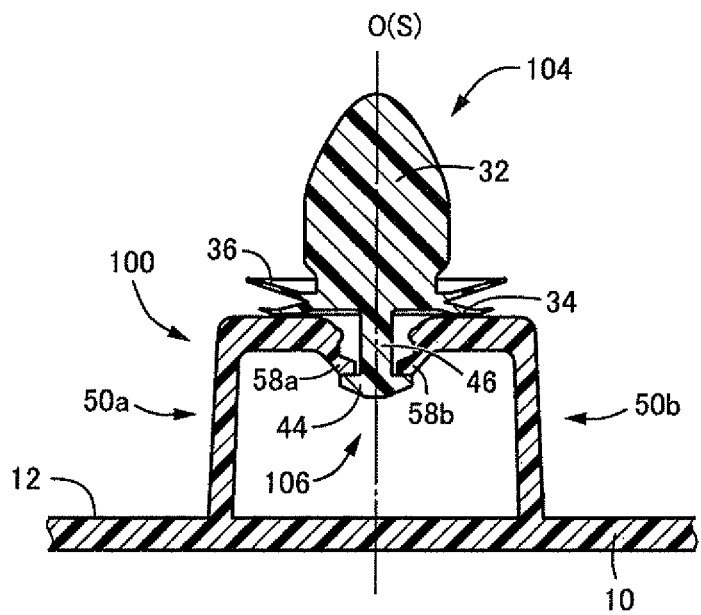

When the clip 104 is further pushed in the fastening direction, the large-diameter portion 44 elastically deforms the pair of lug members 50a and 50b in such a manner that the distance between the lower latch lugs 58a and 58b is enlarged. Thus, the large-diameter portion 44 is permitted to pass through between the latch lugs 58a and 58b. As a result, as shown in FIG. 11B, the clip 104 is placed in a final fastened state where the latch lugs 58a and 58b have climbed over the large diameter portion 44, are located at the fitted portion 46, and engaged with the upper face of the large-diameter portion 44, and the first seating portion 34 is seated on the upper faces of the lateral plate portions 56a and 56b, as in the first embodiment. The latch lugs 102a and 102b, with which the first projection 106 is first engaged, have small areas at which the latch lugs 102a and 102b are engaged with the large-diameter portion 44 (areas at which the latch lugs 102a and 102b overlap with the large-diameter portion 44 viewed in the fastening direction), and have low fastening load. In contrast, the latch lugs 58a and 58b have large areas, at which the latch lugs 58a and 58b are engaged with the large-diameter portion 44, and have high fastening load. In the third embodiment, the same effects as those in the first embodiment are obtained.

What is claimed is:

1. A fitting system configured to be connected to a vehicle body-side member, comprising:
    a clip including
        a first projection having an engagement portion, and
        a second projection, and
    a trim board including a clip fitting seat, wherein
    the first projection is fastened to the clip fitting seat of the trim board and the second projection is fastened to the vehicle body-side member when the trim board is integrally fixed to the vehicle body-side member;
    the first projection has the engagement portion having a diameter that locally increases and decreases in a predetermined fastening direction that is substantially perpendicular to the trim board and the clip fitting seat has a plurality of latch lugs that are used to position the clip and are elastically deformed so that a distance between the plurality of latch lugs is enlargeable as the engagement portion is engaged with the plurality of latch lugs, so that the first projection is fastened to the clip fitting seat by being pushed in the predetermined fastening direction; and
    at least one of
        (i) at least two types of protruding portions as the engagement portion that differ in diameter are formed in the first projection at locations that are apart from each other in the predetermined fastening direction, or
        (ii) at least two sets of the plurality of latch lugs that differ in engaging area, at which the plurality of latch lugs are engaged with the engagement portion, are formed in the clip fitting seat at locations that are apart from each other in the predetermined fastening direction,
    the at least one of (i) the at least two types of the protruding portions as the engagement portion or (ii) the at least two sets of the plurality of latch lugs are formed so that the clip is fastened to the clip fitting seat in at least two staged fastened states which include an intermediate fastened state that is achieved by fastening the clip to the clip fitting seat at a low fastening load and a final fastened state that is achieved by fastening the clip to the clip fitting seat at a high fastening load.

2. The fitting system according to claim 1, wherein:
    the first projection includes
        a small-diameter portion,
        a constricted portion that is smaller in diameter than the small-diameter portion,
        a large-diameter portion that is larger in diameter than the small-diameter portion, and
        a small-diameter fitted portion formed between the large-diameter portion and a seating portion that is seated on the clip fitting seat, which are formed concentrically with each other and which are located in this order from a tip end of the first projection in a direction in which the first projection is pushed into the clip fitting seat;
    the clip fitting seat has a set of the plurality of latch lugs that is engaged with the small-diameter portion and the large-diameter portion in this order when the first projection is relatively pushed into the clip fitting seat in the predetermined fastening direction, and the distance between the plurality of latch lugs is enlarged due to elastic deformation so that each of the small-diameter portion and the large-diameter portion is permitted to pass through between the plurality of latch lugs;
    the at least two stages of fastened states includes
        the intermediate fastened state in which the small-diameter portion has passed through between the plurality of latch lugs and the plurality of latch lugs are located at the constricted portion, and
        the final fastened state in which the large-diameter portion has passed through between the plurality of latch lugs and the plurality of latch lugs are located at the fitted portion; and
    each of a first diameter increase/decrease portion that extends from the small-diameter portion through the constricted portion to the large-diameter portion and that is used to position the clip in the intermediate fastened state and a second diameter increase/decrease portion that extends from the large-diameter portion through the fitted portion to the seating portion and that is used to position the clip in the final fastened state serves as the engagement portion.

3. The fitting system according to claim 2, wherein:
    the large-diameter portion has a tapered face having a diameter that decreases toward the constricted portion, and the set of latch lugs has partially tapered holding faces that correspond to the tapered face; and
    in the intermediate fastened state, the latch lugs are located at the constricted portion so as to be clamped between the large-diameter portion and the small-diameter portion, and the tapered face of the large-diameter portion is in surface-contact with the holding faces of the latch lugs so that the clip is positioned so as to take a certain posture.

4. The fitting system according to claim 2, wherein:
    the clip fitting seat is formed of a pair of lug members which extend from the trim board and of which upper end portions are apart from each other by a clearance that is smaller than the small-diameter portion;
    a pair of latch lugs is formed in the upper end portions of the pair of lug members so as to face each other; and
    the distance between the pair of latch lugs is enlarged due to elastic deformation of the pair of lug members so that each of the small-diameter portion and the large-diameter portion is permitted to pass through between the pair of latch lugs.

5. The fitting system according to claim 4, wherein end portions of the pair of latch lugs have arc-shaped portions centering on a fitting axis for fastening the clip and having a diameter that is smaller than the small-diameter portion and larger than the clearance between the pair of lug members when viewed from the predetermined fastening direction.

6. The fitting system according to claim 4, wherein:
the pair of lug members has a pair of vertical plate portions that rise up from the trim board so as to be parallel to each other, and lateral plate portions that extend from upper end portions of the vertical plate portions and that are bent in a direction that is substantially perpendicular to the vertical plate portions in such a manner that end portions of the lateral plate portions face each other with the clearance left therebetween; and
the end portions of the lateral plate portions are stepped portions that are formed by bending to recess the end portions of the lateral plate portions toward the trim board, and the stepped portions are used as the pair of latch lugs.

7. The fitting system according to claim 4, wherein:
the pair of lug members has a pair of vertical plate portions that rise up from the trim board, and are substantially parallel to each other with the clearance left therebetween at least upper end portions of the pair of vertical plate portions, and the pair of latch lugs are formed integrally with portions of the upper end portions, which face each other; and
through-holes are formed in portions of the vertical-plate portions, which are immediately below the pair of latch lugs, and each of the small-diameter portion and the large-diameter portion, which has passed through between the pair of latch lugs while elastically deforming the vertical plate portions in such a manner that the vertical plate portions are further apart from each other, is latched with an upper edges of the through-holes so as to be prevented from being removed.

8. The fitting system according to claim 1, wherein:
the first projection includes
a large-diameter portion, and
a small-diameter fitted portion formed between the large-diameter portion and a seating portion that is seated on the clip fitting seat, which are formed concentrically with each other and which are located in this order from a tip end of the first projection in a direction in which the first projection is pushed into the clip fitting seat;
the clip fitting seat has a first pair and a second pair of latch lugs that are engaged with the large-diameter portion when the first projection is relatively pushed into the clip fitting seat in the predetermined fastening direction, that have different engaged areas with each other, and that are disposed apart from each other by a predetermined distance, and a distance between each of the first pair and the second pair of the latch lugs is enlarged due to elastic deformation so that the large-diameter portion is permitted to pass through between the first pair of the latch lugs having a small engaged area and the second pair of the latch lugs having a large engaged area in this order;
the at least two stages of fastened states including
the intermediate fastened state in which the large-diameter portion has passed through between the first pair of the latch lugs having the small engaged area and is located between the first pair of the latch lugs and the second pair of the latch lugs having the large engaged area, and
the final fastened state in which the large-diameter portion has passed through between the second pair of the latch lugs having the large engaged area and both of the first pair and the second pair of the latch lugs are located at the fitted portion; and
each of the large-diameter portion located between the first pair and the second pair of the latch lugs in the intermediate fastened state, and a diameter increase/decrease portion that extends from the large-diameter portion to the seating portion in the final fastened state, the first pair and the second pair of the latch lugs being interposed between the large-diameter portion and the seating portion, serves as the engagement portion.

9. The fitting system according to claim 8, wherein:
the large-diameter portion has a tapered face having a diameter that decreases toward a tip of the first projection in a direction in which the first projection is pushed into the clip fitting seat and the second pair of the latch lugs having the large engaged area has partially tapered holding faces that correspond to the tapered face; and
in the intermediate fastened state, the large-diameter portion is located so as to be clamped between the first pair and the second pair of the latch lugs and the tapered face of the large-diameter portion is in surface-contact with the holding faces of the second pair of the latch lugs so that the clip is positioned so as to take a certain posture.

10. The fitting system according to claim 8, wherein:
the clip fitting seat is formed of a pair of lug members which rise up from the trim board;
each of the first pair and the second pair of the latch lugs is respectively formed in the upper end portions of the pair of lug members so as to face each other; and
a distance between the each of the first pair and the second pair of the latch lugs is enlarged due to elastic deformation of the pair of lug members so that the large-diameter portion is permitted to pass through between the first pair and the second pair of the latch lugs.

11. The fitting system according to claim 10, wherein:
the pair of lug members has a pair of vertical plate portions that rise up from the trim board so as to be parallel to each other, and lateral plate portions that extend from upper end portions of the vertical plate portions and that are bent in a direction that is substantially perpendicular to the vertical plate portions in such a manner that end portions of the lateral plate portions approach each other; and
the end portions of the lateral plate portions are provided with the first pair and the second pair of the latch lugs.

12. The fitting system according to claim 1, wherein the trim board further includes a plurality of the clip fitting seats, to which a plurality of clips are fastened and of which the fastening directions are parallel to each other.

13. A clip comprising:
a first projection having an engagement portion: and
a second projection, wherein
the first projection is fastened to a clip fitting seat of a trim board and the second projection is fastened to a vehicle body-side member when the trim board is integrally fixed to the vehicle body-side member;
the first projection has the engagement portion having a diameter that locally increases and decreases in a predetermined fastening direction that is substantially perpendicular to the trim board;
at least two types of protruding portions as the engagement portion that differ in diameter are formed in the first projection at locations that are apart from each other in the predetermined fastening direction;

the first projection includes
  a small-diameter portion;
  a constricted portion that is smaller in diameter than the small-diameter portion:
  a large-diameter portion that is larger in diameter than the small-diameter portion; and
  a small-diameter fitted portion formed between the large-diameter portion and a seating portion that is seated on the clip fitting seat, which are formed concentrically with each other and which are located in this order from a tip end of the first projection in a direction in which the first projection is pushed into the clip fitting seat; and
each of a first diameter increase/decrease portion that extends from the small-diameter portion through the constricted portion to the large-diameter portion and a second diameter increase/decrease portion that extends from the large-diameter portion through the small-diameter fitted portion to the seating portion serves as the engagement portion.

14. A method for fastening the plurality of clips to the plurality of clip fitting seats in the fitting system according to claim 12, comprising:
  an intermediate fastening step for achieving the intermediate fastened state by relatively moving the plurality of clips close to the plurality of clip fitting seats in the fastening directions; and
  a final fastening step for achieving the final fastened state by simultaneously relatively pushing the plurality of clips fastened to the plurality of clip fitting seats in the intermediate fastened state in the fastening directions by a pushing machine.

15. A clip configured to be fastened to a clip fitting seat of a trim board via a plurality of latch lugs and a vehicle body-side member to fix the trim board integrally to the vehicle body-side member, the clip comprising:
  a first projection configured to be fastened to the clip fitting seat of the trim board, the first projection including an engagement portion having a diameter that locally increases and decreases in a predetermined fastening direction that is substantially perpendicular to the trim board and the engagement portion being formed of at least two types of protruding portions that differ in diameter: and
  a second projection configured to be fastened to the vehicle body-side member, wherein
  the clip is configured to be positioned in the trim board by elastically deforming the plurality of latch lugs of the clip fitting seat in such a manner that a distance between the plurality of latch lugs is enlargeable as the engagement portion is engaged with the plurality of latch lugs when the first projection is fastened to the clip fitting seat by being pushed in the predetermined fastening direction; and
  the clip is fastened to the clip fitting seat in at least two staged fastened states which include an intermediate fastened state that is achieved by fastening the clip to the clip fitting seat at a low fastening load and a final fastened state that is achieved by fastening the clip to the clip fitting seat at a high fastening load.

\* \* \* \* \*